US009517538B2

(12) United States Patent
Nagy

(10) Patent No.: US 9,517,538 B2
(45) Date of Patent: Dec. 13, 2016

(54) MOTOR-POWERED MACHINE TOOL, IN PARTICULAR A HAND-HELD MACHINE TOOL

(75) Inventor: Attila Nagy, Miskolc-Szirma (HU)

(73) Assignee: Robert Bosch GmbH, Stuttgart (DE)

(*) Notice: Subject to any disclaimer, the term of this patent is extended or adjusted under 35 U.S.C. 154(b) by 471 days.

(21) Appl. No.: 13/885,469

(22) PCT Filed: Oct. 12, 2011

(86) PCT No.: PCT/EP2011/067812
§ 371 (c)(1),
(2), (4) Date: Sep. 3, 2013

(87) PCT Pub. No.: WO2012/065789
PCT Pub. Date: May 24, 2012

(65) Prior Publication Data
US 2013/0337985 A1 Dec. 19, 2013

(30) Foreign Application Priority Data
Nov. 17, 2010 (DE) .................. 10 2010 044 061

(51) Int. Cl.
B23Q 3/157 (2006.01)
B25F 1/04 (2006.01)
(Continued)

(52) U.S. Cl.
CPC .......... *B23Q 3/15766* (2013.01); *B25B 23/06* (2013.01); *B25F 1/04* (2013.01); *B25F 5/029* (2013.01);
(Continued)

(58) Field of Classification Search
CPC .................... Y10T 483/1745; Y10T 483/1755; Y10T 483/1757; Y10T 483/1767; Y10T 483/1769; Y10T 483/1774; Y10T 483/1779; Y10T 483/1783; Y10T 483/179; Y10T 483/1798; Y10T 483/1818; Y10T 483/1827; B23Q 3/15733; B25F 5/029
(Continued)

(56) References Cited

U.S. PATENT DOCUMENTS 2,891,426 A * 6/1959 Martin et al. ................. 408/1 R
3,191,260 A * 6/1965 Jorgensen ....................... 483/56
(Continued)

FOREIGN PATENT DOCUMENTS

CN 201055983 Y * 5/2008
CN 101563192 A 10/2009
(Continued)

OTHER PUBLICATIONS

International Search Report corresponding to PCT Application No. PCT/EP2011/067812, mailed Feb. 9, 2012 (German and English language document) (5 pages).

*Primary Examiner* — Sunil K Singh
*Assistant Examiner* — Michael Vitale
(74) *Attorney, Agent, or Firm* — Maginot, Moore & Beck LLP

(57) ABSTRACT

A motor-powered machine tool includes a drum-like tool-changing magazine having tool chambers. The magazine is arranged inside a housing, and when the tool is in a change position, one of the tool chambers of the tool-changing magazine is aligned with a tubular tool holder. The tool further includes a sliding element configured to slide a tool from the tool-changing magazine into the tool holder and from the tool holder back into the tool-changing magazine. The sliding element is movable in a longitudinal direction of the tool holder. In at least one embodiment, the sliding element is coupled with a gearbox system which includes at
(Continued)

least one toothed gear. The rotational motion of the toothed gear is translated into linear movement of the sliding element.

16 Claims, 7 Drawing Sheets

(51) Int. Cl.
*B25B 23/06* (2006.01)
*B25F 5/02* (2006.01)

(52) U.S. Cl.
CPC ......... *Y10T 483/17* (2015.01); *Y10T 483/1755* (2015.01); *Y10T 483/1798* (2015.01); *Y10T 483/1827* (2015.01)

(58) Field of Classification Search
USPC ........ 483/35, 39, 40, 44, 45, 47, 49, 51, 54, 57,483/60, 61; 81/57.37, 177.4, 439, 490
See application file for complete search history.

(56) References Cited

U.S. PATENT DOCUMENTS

| | | | | |
|---|---|---|---|---|
| 4,604,005 A | * | 8/1986 | Russ | 408/35 |
| 5,065,498 A | | 11/1991 | McKenzie | |
| 5,300,006 A | * | 4/1994 | Tanaka et al. | 483/56 |
| 5,346,453 A | * | 9/1994 | Rivera-Bottzeck | 483/1 |
| 5,893,685 A | * | 4/1999 | Olson et al. | 408/35 |
| 6,949,057 B2 | * | 9/2005 | Everson et al. | 483/47 |
| 2010/0279839 A1 | * | 11/2010 | Moser et al. | 483/36 |

FOREIGN PATENT DOCUMENTS

| | | |
|---|---|---|
| DE | 100 13 984 A1 | 9/2001 |
| DE | 100 45 617 A1 | 4/2002 |
| DE | 10 2006 059 688 A1 | 6/2008 |
| WO | 96/30146 A1 | 10/1996 |

* cited by examiner

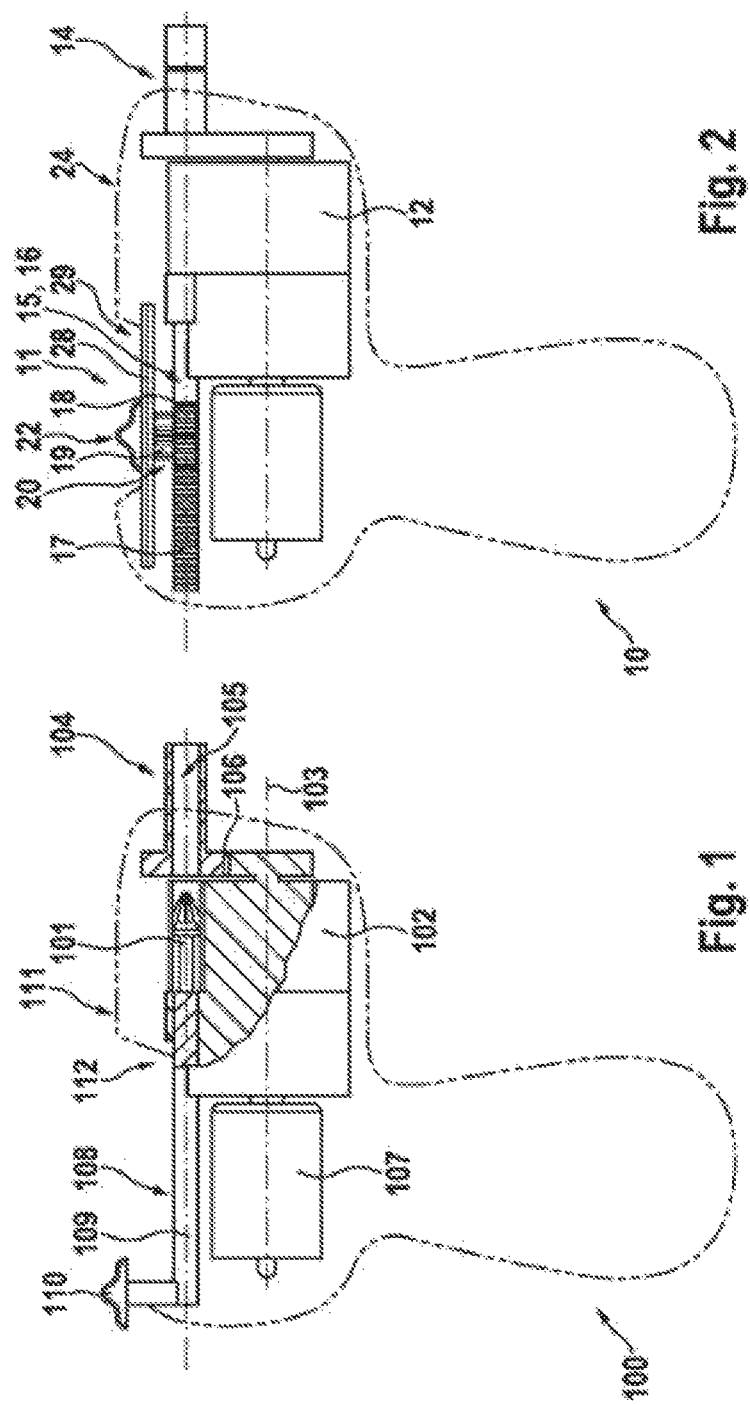

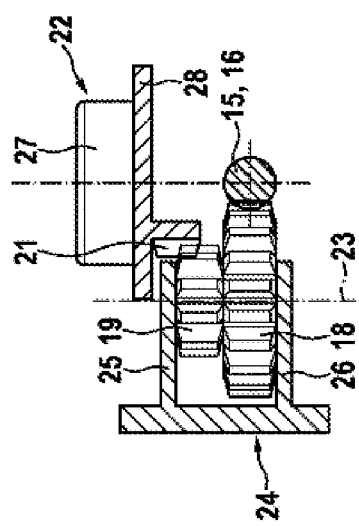
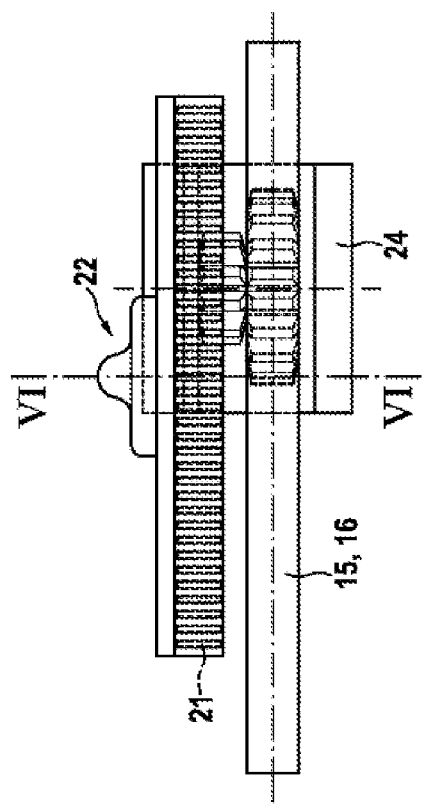

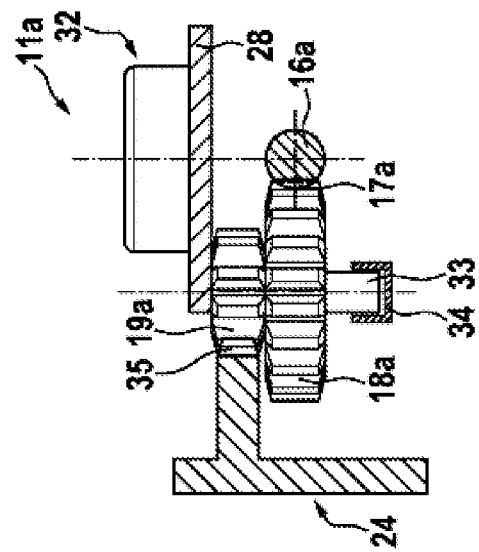
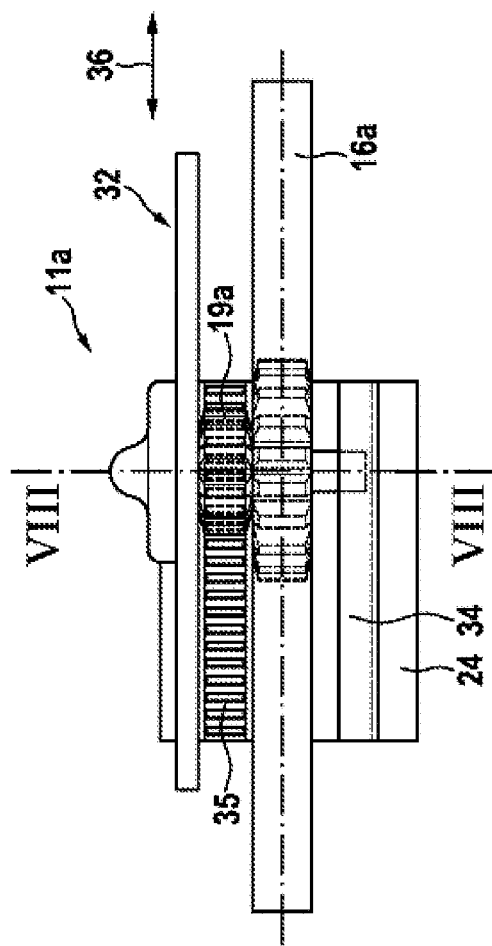

MOTOR-POWERED MACHINE TOOL, IN PARTICULAR A HAND-HELD MACHINE TOOL

This application is a 35 U.S.C. §371 National Stage Application of PCT/EP2011/067812, filed on Oct. 12, 2011, which claims the benefit of priority to Serial No. DE 10 2010 044 061.2, filed on Nov. 17, 2010 in Germany, the disclosures of which are incorporated herein by reference in their entirety.

BACKGROUND

The disclosure relates to a motor-powered machine tool, in particular a hand-held machine tool, in accordance with the description below.

A machine tool of this type is already known from DE 10 2006 059 688 A1 from the applicant. The known machine tool has a drum-like tool magazine, in which in each case one tool is arranged in a tool chamber. The tool magazine can be rotated in its longitudinal axis, with the result that a tool chamber can be arranged in alignment with a tubular sliding channel, via which a required tool can be slid into a receptacle of the machine tool or can be moved back into the tool chamber again from the tool receptacle. A manually actuable sliding element serves this purpose, which sliding element is of substantially pin-shape configuration and can be actuated by means of a handle which penetrates the housing in the housing upper side. On account of the relatively long displacement path, the handle which can be actuated by the operator requires a relatively long displacement path on the housing upper side. As a result, the housing also has a relatively large or elongate opening for the handle, which aids the entry of dirt or contaminants into the housing interior. Moreover, the configuration of the housing upper side is restricted and/or other operating elements have to be arranged at other locations of the housing.

SUMMARY

Proceeding from the prior art which is shown, the disclosure is based on the object of developing a motor-powered machine tool, in particular a hand-held machine tool, in accordance with the description below in such a way that it is configured to be as compact as possible at least in the region of the sliding device which penetrates the housing. This object is achieved in a motor-powered machine tool having the features described below. Here, the disclosure is based on the concept of coupling the sliding element to a gear-mechanism device which comprises at least one gearwheel, the rotational movement of which is converted into a linear movement of the sliding element. A configuration of this type makes the advantage possible that displacement paths which are as large as desired can be realized with a relatively low space requirement for the manually actuable operating element. In particular, it is made possible as a result to configure the manually actuable operating element in the form of a rotary knob or rotary disk which requires only a relatively small cutout in the housing, with the result that the outer configuration of the housing on the housing upper side can be configured more freely than in the prior art, satisfactory and simple sealing of the housing in the region of the operating element being made possible at the same time.

Advantageous developments of the motor-powered machine tool according to the disclosure are specified in the description below. All combinations of at least two of the features which are disclosed in the description below, the description and/or the figures fall under the scope of the disclosure.

One embodiment is preferred, in which the at least one gearwheel is coupled to a manually actuable adjusting element. Here, the adjusting element can be configured, as already explained, in particular, as a rotary switch or rotary knob, or else as a sliding switch. A configuration of this type of the adjusting element can be produced relatively inexpensively and requires a relatively low space requirement in comparison with a motor-actuable drive.

It is provided here, in particular, that the adjusting element penetrates an opening of the housing. This makes simple gripping of the adjusting element from the outside by the operator possible.

It is very particularly preferable that the adjusting element is arranged such that it is sealed with respect to the housing. As a result, the entry or the ingress of dirt, dust or the like into the housing interior is prevented, with the result that the machine tool operates particularly reliably over its entire service life.

In order to convert the rotary movement of the gearwheel into a linear movement of the sliding element, it is provided in one preferred structural refinement of the disclosure that the sliding element is configured at least in regions as a toothed rack. As a result, a mechanically relatively simple construction is made possible which can be produced inexpensively and operates reliably.

Furthermore, one embodiment is particularly preferred, in which a plurality of gearwheels are provided which produce a displacement transmission ratio of the adjusting element on the sliding element. In other words, this means that a relatively large displacement travel on the sliding element is produced, for example, with a relatively small rotational movement on the adjusting element. As a result, the handling is facilitated for the operator to the extent that, for example, it is not necessary to reach around the adjusting element, in order to produce a defined displacement travel.

Furthermore, it is particularly preferred if the sliding element is arranged so as to be in engagement by way of a toothing system on mutually opposite sides with in each case one gearwheel. As a result, particularly satisfactory or defined guidance of the sliding element is made possible.

The angularly correct feeding of the tool which is provided with an outer contour into the tool receptacle which is provided with a corresponding inner contour is critical when sliding tools into the tool receptacle. Jamming of the tool with respect to the tool receptacle can occur here, which makes the actuation more difficult, since the operation possibly has to be repeated until a corresponding angular position between the tool and the tool receptacle is reached. It is therefore proposed in one particularly preferred refinement of the disclosure that an inner contour is formed on the inner circumference of the tool receptacle and an outer contour is formed on the tool, which contours interact with one another and bring about a rotationally fixed arrangement of the tool at least in an axial end position of the tool in the tool receptacle, and that a region with at least one entry guide is formed on the inner circumference of the tool receptacle on the side which faces the sliding element, which entry guide, during sliding of the tool into the tool receptacle, brings about an angularly correct alignment of the tool with respect to the tool receptacle.

As an alternative, however, it is also conceivable that the tool receptacle has an inner contour and the tool has an outer contour, which contours interact with one another and bring about a rotationally fixed arrangement of the tool at least in an axial end position of the tool in the tool receptacle, and that the inner contour which is formed on the inner circumference of the tool receptacle has a plurality of longitudinal ribs with entry edges.

If longitudinal ribs are used, it can be provided structurally that the longitudinal ribs have a rounded or triangular cross section. Shapes of this type can be produced relatively simply and precisely and are therefore particularly suitable for use in the tool receptacle.

BRIEF DESCRIPTION OF THE DRAWINGS

Further advantages, features and details of the disclosure result from the following description of preferred exemplary embodiments and using the drawing, in which:

FIG. 1 shows a simplified longitudinal section through a motor-powered machine tool according to the prior art, FIG. 2 shows a simplified longitudinal section through a motor-powered machine tool according to the disclosure, FIG. 5 shows a first sliding mechanism according to the disclosure in a side view, FIG. 6 shows a section in the plane VI-VI from FIG. 5, FIG. 7 shows a second sliding mechanism according to the disclosure in a side view, FIG. 8 shows a section in the plane VIII-VIII from FIG. 7.

DETAILED DESCRIPTION

Figure 3:
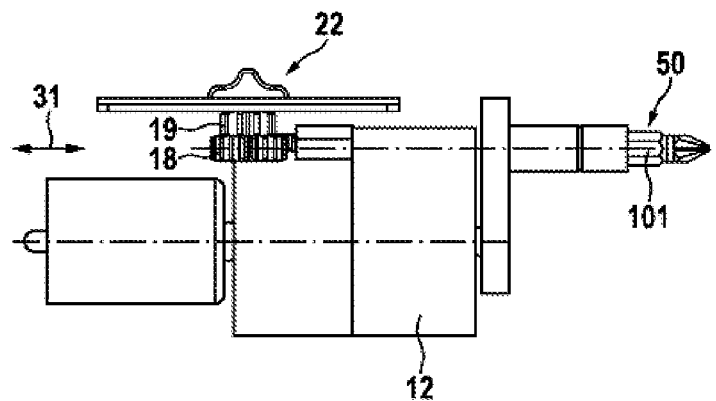
FIGS. 3 and 4 show parts of the machine tool according to FIG. 2 in order to explain the functionality of the tool change magazine, in a simplified side view and longitudinal section.

Identical components or components with the same function are provided with the same designations in the figures.

FIG. 1 shows a motor-powered machine tool 100 in the form of a hand-held machine tool according to the prior art, in a greatly simplified form. Here, the machine tool 100 is configured in the form of what is known as a "bit screwdriver" which is suitable for handling various tools 101 in the form of bit inserts. The tools 101 are arranged in chambers (not shown in FIG. 1) of a turret-like tool magazine 102, the tool magazine 102 being arranged in a mounted manner such that it can be rotated in a longitudinal axis 103. Furthermore, the machine tool 100 has a tool receptacle 104 which has a tubular region 105, into which the respective tool 101 to be used is pushed from the tool magazine 102. In order to be exchanged for a new tool 101, the tool receptacle 104 is rotated into congruence with an empty chamber of the tool magazine 102. The tool receptacle 104 is coupled via a gear toothing system 106 to a drive motor 107 in order to drive the tool 101, which drive motor 107 produces a corresponding rotational movement of the tool receptacle 104, the tool 101 being arranged in a rotationally fixed manner in the tool receptacle 104 in the case of driving.

In the prior art, a tool 101 is pushed from the chamber of the tool magazine 102 into the tubular region 105 of the tool receptacle 104 by means of a sliding element 108 in the form of a slide 109. Here, the slide 109 has a handle 110 which can be actuated manually by an operator and penetrates the housing 111 of the machine tool 100 in the region of an opening 112 of the housing 111. That end of the slide 109 which faces the tool 101 is, for example, of magnetic configuration, in order to realize a magnetic attachment of the tool 101 to the slide 109, which magnetic attachment is required, in particular, when the tool 101 is pulled back out of the tool receptacle 104 into the chamber of the tool magazine 102.

Furthermore, the machine tool 100 has adjusting means (not shown) for rotating the tool magazine 102 in its longitudinal axis 103, in order that that chamber of the tool magazine 102 which is equipped with the desired tool 101 can be rotated into alignment with the slide 109 or the tool receptacle 104. With regard to further details of a machine tool 100 according to the prior art, moreover, reference is made to DE 10 2006 059 688 A1 from the applicant which to this extent is to be a constituent part of the present application.

FIG. 2 shows the fundamental construction of a machine tool 10 according to the disclosure which differs from the machine tool 100 according to the prior art according to FIG. 1, in particular, in the region of the sliding mechanism 11 for transferring a tool 101 out of the tool magazine 12 into the tool receptacle 14.

The sliding mechanism 11 has a sliding element 15 in the form of a slide 16, which sliding element 15 is configured at least in regions in the form of a toothed rack with a toothing system 17. Here, the toothing system 17 interacts with at least one, but in particular with at least two, gearwheels 18, 19 which can be seen in FIG. 2 and form a gear mechanism 20. One gearwheel 18 meshes with the toothing system 17 of the slide 16, whereas the other gearwheel 19, as can be seen best using a combination of FIGS. 5 and 6, interacts with a toothing system 21 of a manually actuable rotary switch 22. The two gearwheels 18, 19 have a different diameter and are mounted in a rotationally fixed manner with respect to one another in a common rotational axis 23. An axle which cannot be seen in FIG. 6 and is mounted into two crossmembers 25, 26 which are arranged on the housing 24 of the machine tool 10 serves to mount the two gearwheels 18, 19.

As can be seen, in particular, from a combination of FIGS. 2 and 6, the rotary switch 22 has a rotary knob 27 which can be grasped by the fingers of the operator and which is adjoined by a circular plate 28 on the side which faces the gearwheel 19. The plate 28 closes an opening 29 of the housing 24, the region between the plate 28 and the opening 29 being of sealed configuration on the housing 24.

Figure 4:
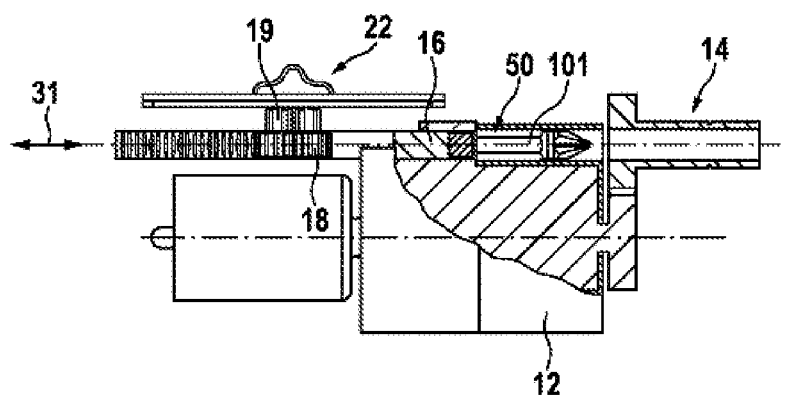

The method of operation of the sliding mechanism 11, as can be seen, in particular, using FIGS. 3 and 4, is such that, in the case of a rotation of the rotary switch 22 in the clockwise or in the counterclockwise direction, the rotational movement of the rotary switch 22 or the rotation of the gearwheels 18, 19 which are arranged in a rotationally fixed manner with respect to one another is converted into a linear movement of the slide 16 in the direction of the double arrow 31. As a result of a corresponding variation of the diameter of the two gearwheels 18, 19 or their number of teeth, a desired displacement transmission ratio is possible in such a way that a relatively small rotation of the rotary switch 22 results in a relatively large displacement travel of the slide 16.

FIGS. 7 and 8 show a modified sliding mechanism 11a. Here, the rotary switch 22 is replaced by a sliding switch 32 which is likewise preferably sealed with respect to the housing 24 and to the underside of which the gearwheel 19a is fastened together with the gearwheel 18a in an axle 33. The axle 33 is guided on the housing 24 in a linear guide 34, the gearwheel 19a interacting with the toothing system 17a of the slide 16a and the gearwheel 18a being supported on a toothing system 35, arranged in a stationary manner, of the housing 24. The method of operation of the sliding mechanism 11a is such that a linear movement of the sliding switch 32 in the direction of the double arrow 36 is converted into a rotation of the gearwheels 18a, 19a, which rotation in return moves the slide 16 in the direction of the double arrow 36.

In comparison with the sliding mechanism 11, the sliding mechanism 11a has the advantage that a greater transmission ratio of the gearwheels 18a, 19a can be achieved than with the gearwheels 18, 19, with the result that the diameter of the gearwheels 18a, 19a can be selected to be smaller than that of the gearwheels 18, 19.

Figure 9:
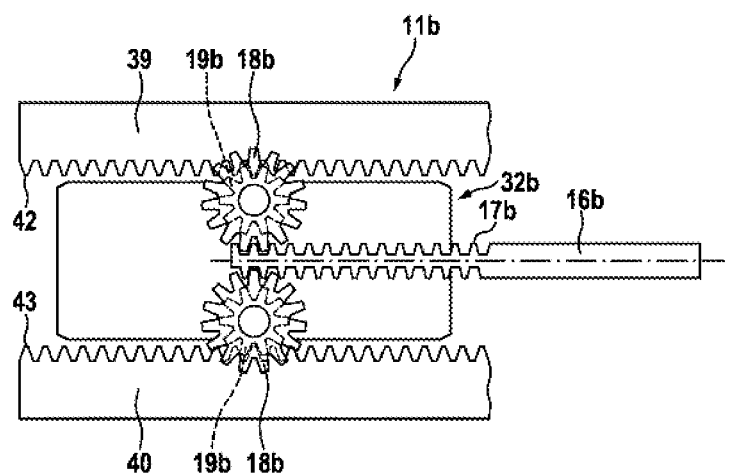
FIG. 9 shows a third sliding mechanism according to the disclosure in a bottom view.
Figure 10:
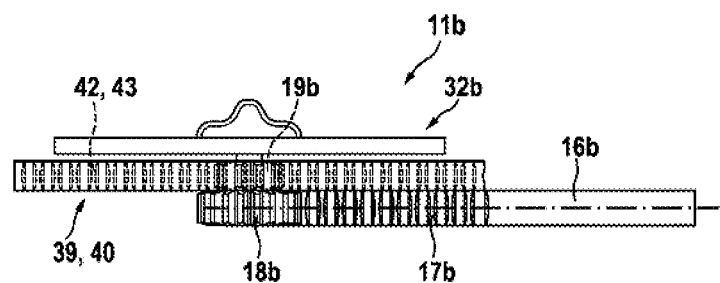
FIG. 10 shows the sliding mechanism according to FIG. 9 in a side view.

FIGS. 9 and 10 show a third sliding mechanism 11b which is based substantially on the sliding mechanism 11a of FIGS. 7 and 8. The sliding mechanism 11b has a sliding switch 32b which acts on the toothing system 17b of the slide 16b via two gearwheels 18b which are arranged on both sides of the slide 16b. Furthermore, two guides 39, 40 which are fixed to the housing are provided with toothing systems 42, 43 which interact with the gearwheels 19b. The sliding mechanism 11b is distinguished by relatively low friction and particularly satisfactory guidance of the slide 16b.

Figures 11, 12:
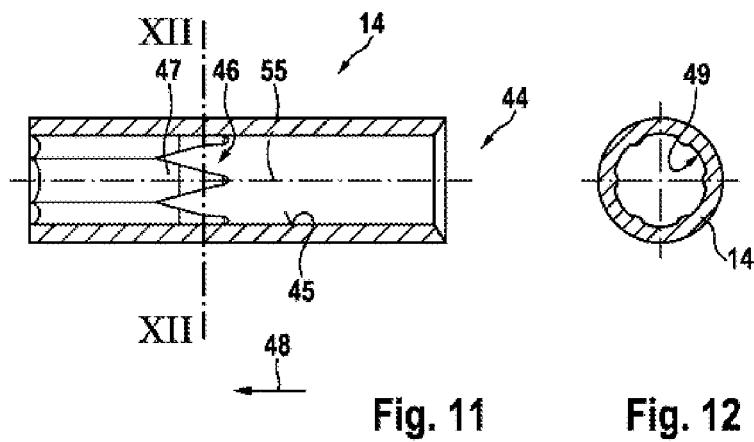
FIG. 11 shows a tool receptacle in a longitudinal section.
FIG. 12 shows a section in the plane XII-XII from FIG. 11.
Figure 13:
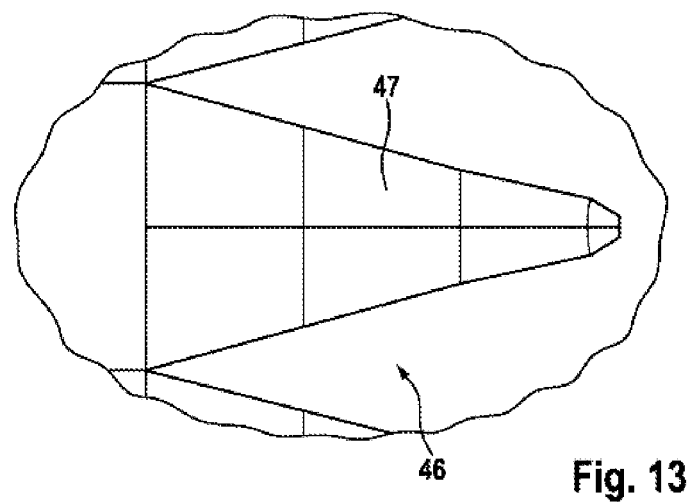
FIG. 13 shows a detail from FIG. 11 in an enlarged illustration.

FIGS. 11 to 13 show that part region of the tool receptacle 14 which faces the tool magazine 12 in more detail. Here, in particular on the side 44 which faces the tool magazine 12, a region 46 is seen on the inner circumference 45 of the tool receptacle 14, which region 46 acts as positioning region and makes angularly correct positioning of the tool 101 in the tool receptacle 14 possible during sliding of the tool 101 from the tool magazine 12 into the tool receptacle 14. Here, the region 46 has a plurality of entry guides 47 which are of wedge-like configuration and the tips of which protrude toward the side 44. During sliding of the tool 101 in the direction of the arrow 48, the tool 101 which has, in particular, a hexagonal cross section passes with its outer contour 50 (see FIGS. 3, 4) into an operative connection with the entry guides 47 and, during its linear movement or during sliding, is aligned with the inner contour 49 of the region 46 in such a way that, during sliding, jamming of the outer contour 50 of the tool 101 with the inner contour 49 of the region 46 of the tool receptacle 14 is avoided.

Figure 16:
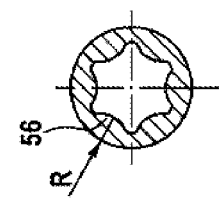
FIG. 16 shows a section in the plane XV-XV from FIG. 14 in a configuration variant which is modified with respect to FIG. 15.
Figure 15:
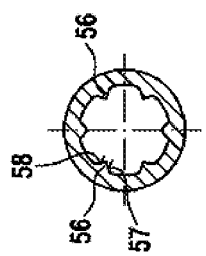
FIG. 15 shows a section in the plane XV-XV from FIG. 14 in a first configuration variant.
Figure 14:
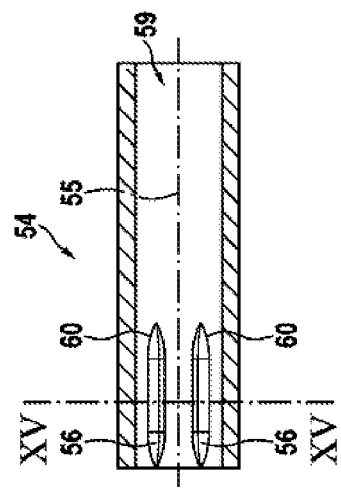
FIG. 14 shows a modified tool receptacle in a longitudinal section.

FIGS. 14 to 16 show a modified tool receptacle 54. The tool receptacle 54 is distinguished by a plurality of longitudinal ribs 56 which are arranged parallel to the longitudinal axis 55 of the tool receptacle 54 at uniform angular intervals on the inner circumference of the tool receptacle 54. As can be seen, in particular, using FIG. 15, the longitudinal ribs 56 have a triangular shape with straight side faces 57, 58 here.

In a modification, however, it can also be possible in accordance with FIG. 16 that the longitudinal ribs 56 have a curved contour with a radius R in cross section. It is seen, furthermore, that the longitudinal ribs 56 have entry edges 60 at least on the side 59 which faces the tool magazine 12, which entry edges 16 make an angularly correct alignment of the tool 101 or its outer contour 50 with the longitudinal ribs 56 possible.

The above-described machine tool 10 according to the disclosure can be altered or modified in a wide variety of ways, without deviating from the concept of the disclosure. It is thus possible, for example, to provide a motor-powered sliding mechanism instead of a manual operation of the sliding mechanism 11, 11a, 11b. It is also conceivable to dispense with the specially adapted tool receptacle 14, 54 for the angularly correct alignment of the tool 101.

The invention claimed is:

1. A motor-powered machine tool, comprising:
   a housing;
   a tubular tool receptacle;
   a drum-like tool change magazine having a plurality of tool chambers, the tool change magazine arranged within the housing and configured to selectively position each of the tool chambers in a change position in which a longitudinal axis of the positioned tool chamber is coincident with a longitudinal axis of the tool receptacle;
   a sliding element configured to be moved relative to the tool receptacle in a direction extending parallel to the longitudinal axis of the tool receptacle and configured to act upon a tool from the tool change magazine and slide the tool into the tool receptacle and slide the tool from the tool receptacle back into the tool change magazine;
   a gear-mechanism device coupled to the sliding element and including at least one gearwheel, wherein rotational movement of the at least one gearwheel is converted into a linear movement of the sliding element; and
   an adjusting element mechanically coupled to the at least one gearwheel for purely mechanical actuation of the at least one gearwheel by the adjusting element,
   wherein manual actuation of the adjusting element causes the adjusting element to rotate the at least one gearwheel.

2. The machine tool as claimed in claim 1, wherein the adjusting element penetrates an opening of the housing.

3. The machine tool as claimed in claim 2, wherein the adjusting element is arranged such that it is sealed with respect to the housing.

4. The machine tool as claimed in claim 1, wherein the sliding element is configured at least in regions as a toothed rack.

5. The machine tool as claimed in claim 1, wherein the gear-mechanism device includes a plurality of gearwheels configured to produce a displacement transmission ratio of the adjusting element relative to the sliding element.

6. The machine tool as claimed in claim 4, wherein the at least one gearwheel includes a first gearwheel and a second gearwheel,
   wherein the sliding element has mutually opposite sides that each include a toothing system, and wherein the sliding element is arranged such that the first gearwheel and the second gearwheel each engage the toothing system of one of the mutually opposite sides.

7. The machine tool as claimed in claim 1, wherein:
   the tool receptacle includes an inner contour formed on an inner circumference of the tool receptacle,
   the tool includes an outer contour that extends in a direction that is parallel to the longitudinal axis of the tool receptacle along at least a portion of a longitudinal axis of the tool, the inner contour and the outer contour are configured to interact with one another and bring about a rotationally fixed arrangement of the tool at least in an axial end position of the tool in the tool receptacle, the inner circumference of the tool receptacle includes a region with at least one entry guide formed on a side which faces the sliding element, and the entry guide, during sliding of the tool into the tool receptacle, angularly aligns the longitudinal axis of the tool so as to be parallel with respect to the longitudinal axis of the tool receptacle.

8. The machine tool as claimed in claim 1, wherein:

the tool receptacle has an inner contour and the tool has an outer contour that extends in a direction that is parallel to the longitudinal axis of the tool receptacle along at least a portion of a longitudinal axis of the tool, the inner contour and the outer contour are configured to interact with one another and bring about a rotationally fixed arrangement of the tool at least in an axial end position of the tool in the tool receptacle, and the inner contour is formed on an inner circumference of the tool receptacle and has a plurality of longitudinal ribs with entry edges, the longitudinal ribs extending parallel to the longitudinal axis of the tool receptacle.

9. The machine tool as claimed in claim 8, wherein the longitudinal ribs have one of a rounded cross section and a triangular cross section.

10. The machine tool as claimed in claim 1, wherein the adjusting element is embodied as a rotary adjusting element, wherein upon manual actuation of the rotary adjusting element rotational movement of the rotary adjusting element is converted into the linear movement of the sliding element.

11. The machine tool as claimed in claim 10, wherein the gear-mechanism device includes a first gearwheel and a second gearwheel, wherein the first gearwheel is configured to mesh with a toothing system of the sliding element and the second gearwheel is configured to mesh with a toothing system of the rotary adjusting element.

12. The machine tool as claimed in claim 11, wherein the first gearwheel and the second gearwheel have a different diameter or a different number of teeth and are mounted in a rotationally fixed manner with respect to one another in a common rotational axis.

13. The machine tool as claimed in claim 1, wherein the adjusting element is embodied as a sliding adjusting element, wherein upon manual actuation of the sliding adjusting element linear movement of the sliding adjusting element is converted into the linear movement of the sliding element.

14. The machine tool as claimed in claim 13, wherein the gear-mechanism includes a first gearwheel and a second gearwheel, wherein the first gearwheel is configured to mesh with a toothing system of the sliding element and the second gearwheel is configured to mesh with a toothing system disposed on the housing.

15. The machine tool as claimed in claim 14, wherein the first gearwheel and the second gearwheel are arranged on an axis which is perpendicular to a sliding axis of the sliding element.

16. The machine tool as claimed in claim 13, wherein the gear-mechanism device includes two first gearwheels and two second gearwheels, wherein the two first gearwheels are arranged on opposite sides of the sliding element and configured to mesh with a toothing system of the sliding element, and the two second gearwheels are configured to each mesh with a toothing system disposed on the housing.

* * * * *